H. A. WILLIAMS.
AUTOMOBILE LOCK.
APPLICATION FILED JUNE 22, 1916.
1,241,471.
Patented Sept. 25, 1917.
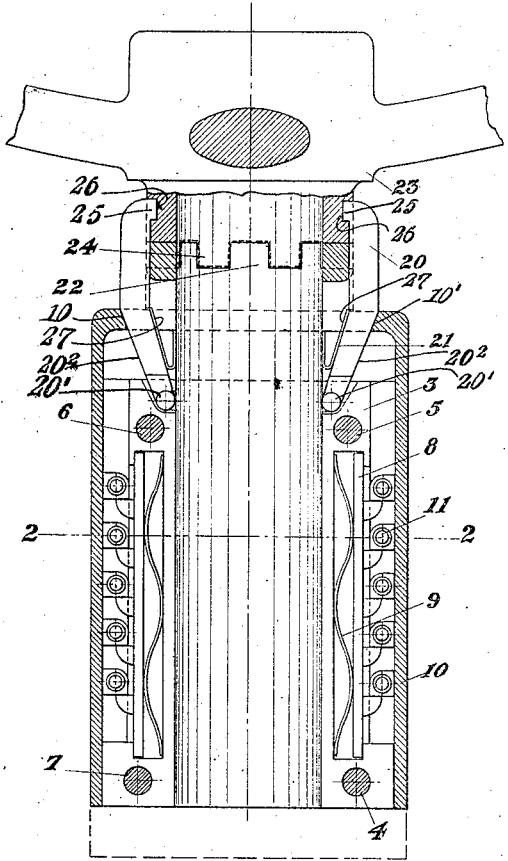
Fig. 1.
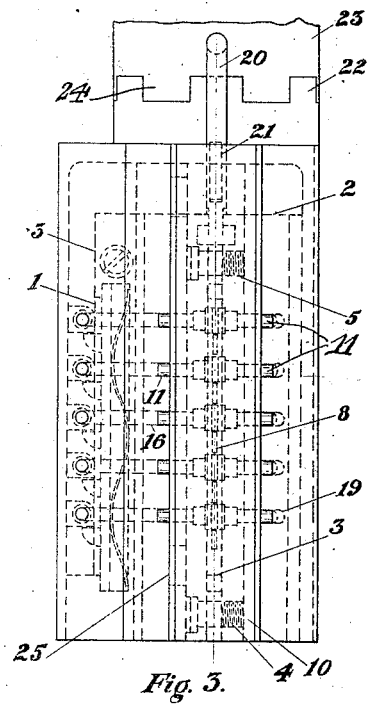
Fig. 5.
Fig. 3.
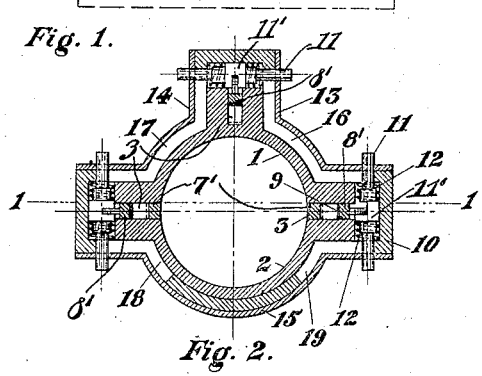
Fig. 2.
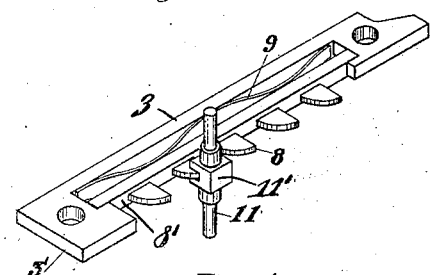
Fig. 4.
WITNESSES:
J. E. Barragar
[signature]
Harry A. Williams INVENTOR.

UNITED STATES PATENT OFFICE.

HARRY A. WILLIAMS, OF THANE, TERRITORY OF ALASKA.

AUTOMOBILE-LOCK.

1,241,471.     Specification of Letters Patent.     Patented Sept. 25, 1917.

Application filed June 22, 1916. Serial No. 105,160.

*To all whom it may concern:*

Be it known that I, HARRY A. WILLIAMS, a naturalized citizen of Canada, American born, now residing at Thane, in the Territory of Alaska, have invented a new and useful Automobile-Lock, of which the following is a specification.

My invention relates to new and useful improvements in locks for automobile steering wheels.

The object of my invention is to provide a lock for automobile steering wheels which can be readily applied to the ordinary steering column and so constructed that it interlocks with an integral part of the steering wheel to prevent the rotation thereof. I also provide means for preventing the upward movement of the steering wheel to prevent the removal of the same, so as to prevent the rotating means from being disengaged from the locking member.

Another object of my invention is to provide a lock of this character in which a key is dispensed with, and in which a single operation of the locking sleeve locks both of the locking means and likewise a single operation unlocks both of the locking means and providing certain details of structure, operation, and combination of parts hereinafter more fully pointed out.

In the accompanying drawings:—

Figure 1 is a side elevation of a steering column partly in section showing my improved lock applied thereto.

Fig. 2 is a horizontal transverse sectional view taken on the line 2—2 of Fig. 1.

Fig. 3 is a side elevation of Fig. 1 showing the combination locking member in dotted lines for holding the outer casing in its raised position.

Fig. 4 is a perspective view of one of the liners and combination pins in their operative position.

Fig. 5 is a side elevation of two of the combination pins showing the slots which allow the vertical movement of the member 8'.

Referring now to the drawings, 1 represents one half of the inner casing and 2 the other half held together by the four fillister head screws 4, 5, 6 and 7, as clearly shown in Fig. 1 of the drawings; whereby the said casing is locked on the steering column below the steering wheel. The said inner casing is provided with a series of radially arranged vertical grooves 7' communicating with the bore of the casing and in which are secured the liners 3 by the screws 4, 5, 6 and 7 and which extend approximately the entire length of the inner case. The liners have their upper and lower ends turned inwardly at 3' and which engage the outer edge of the member 8', which is normally forced outwardly by the spring 9. The outer edge of the members 8' are provided with teeth 8 which engage the combination pins 11. The combination pins 11 are carried by the outer case 10 which is held in position by the outer portion of the guides forming the grooves or slots 7'. The outer casing 10 has sheet steel plates slipped over combination pins 11 and serve to hold the pins in a straight position in the case 10. The combination pins are held in a central position by coil springs 12 which allows the pins to be pushed inward or outward from either side and which brings the enlarged portion 11' out of alinement with the teeth 8 whereby the outer casing is free to move away from the steering wheel. The bend of the teeth 8 causes the member 8' to be moved inwardly against the tension of the spring 9 and allows the outer casing to be moved upwardly without operating the combination pins 11.

The steering wheel 23 has formed integral, or locked thereon, an annular flange having its lower edge provided with teeth 24, which interlock with the teeth 22 carried by the upper end of the casing 10 and the upward movement of the casing 10 causes the teeth 22 and 24 to interlock and prevent the rotation of the steering wheel.

The inner casing has pivoted on opposite sides at 20', the triggers 20 which have oblique portions 20² which pass through openings 10' in the outer casing 10. The upper ends of said triggers are turned inwardly as indicated at 25 and enter the notches or recesses 26 in the flange carried by the steering wheel which will prevent the upward movement of the steering wheel. This prevents the removal of the steering wheel by the removal of the nut above the same. The triggers are normally outwardly held by means of springs 27 and the lowering of the outer casing 10 allows the triggers to automatically move outward to disengage the upper ends from the recesses in the flange of the steering wheel. The upward movement of the outer casing brings the teeth 22 into mesh or engagement with and the opening in the outer casing engaging the oblique portion of the triggers and forces the same inwardly to cause the same to simultaneously lock and whereby the steering wheel is not only locked against rotation but also against upward movement.

The outer casing 10 is held in the raised position by the straight edges of the teeth engaging the flat portion 11' of the combination pins 11, and by operating certain pins the outer casing can be moved downwardly to disengage the steering wheel. Owing to the bevel of the teeth 8 and the spring 9 the outer casing 10 can be moved upwardly without operating any of the combination pins, but said casing cannot be moved downwardly without operating the combination pins.

I claim:

1. In a locking device for automobiles, the combination with the steering column and wheel, of a casing secured to the column, means carried by the casing for locking the wheel against rotation, a separate means carried by the casing for locking the wheel against upward movement, and a lock for holding said means in engagement with the wheel.

2. In a locking device for automobiles, the combination with the steering column and wheel, of a casing secured to the steering column, means carried by the casing for locking the wheel against upward movement, a sliding sleeve carried by the casing for operating said locking means, means carried by the sleeve for locking the wheel against rotation and a lock for holding the sleeve in a position with the means engaging the wheel.

3. In a locking device for automobiles, the combination with the steering column and wheel, of a casing removably secured to the column below the wheel, a vertically movable member carried by the casing and engaging the steering wheel, pivoted members carried by the casing and engaging the wheel, and a lock within the casing for locking the sliding and pivoted members in engagement with the wheel.

4. In a locking device for automobiles, the combination with the steering column and wheel, of a casing removably secured to the column below the wheel, a vertically movable member carried by the casing and engaging the steering wheel, pivoted members carried by the casing and engaging the wheel, sliding members carried by the casing and locking the sliding and pivoted members in engagement with the wheel, and sliding tumblers locking the means.

5. In a locking device for automobiles, the combination with the steering column and wheel, of a casing removably secured to the column and surrounding the same below the wheel, pivoted members carried by the casing and engaging the steering wheel, a vertically sliding member engaging the pivoted members and holding them in engagement with the wheel and having notches adapted to interlock with notches on the wheel, and means for locking said vertically sliding member in its upward position.

6. In a locking device for automobiles, the combination with the steering column and wheel, of a casing removably secured to the column below the wheel, a vertically movable sleeve carried by the casing and engaging the steering wheel, pivoted members carried by the casing and engaging the wheel, sliding members carried by the casing and locking the sliding sleeve and pivoted members in engagement with the wheel and transverse sliding tumblers locking the sliding members.

HARRY A. WILLIAMS.